US008041743B2

(12) United States Patent
Armstrong et al.

(10) Patent No.: US 8,041,743 B2
(45) Date of Patent: *Oct. 18, 2011

(54) SYSTEMS AND METHODS FOR PROVIDING SEMANTICALLY ENHANCED IDENTITY MANAGEMENT

(75) Inventors: Jef Russell Armstrong, Princeton, NJ (US); Andrew Jacob Cohen, Hillsborough, NJ (US); Raymond William Kulberda, Kendall Park, NJ (US); Dhananjay D. Makwana, North Brunswick, NJ (US); Jeffrey David Mershon, Lambertville, NJ (US); Daniel J. Reininger, Princeton, NJ (US); Rajeev Mago, Gurgaon (IN)

(73) Assignee: Semandex Networks, Inc., Princeton, NJ (US)

( * ) Notice: Subject to any disclaimer, the term of this patent is extended or adjusted under 35 U.S.C. 154(b) by 370 days.

This patent is subject to a terminal disclaimer.

(21) Appl. No.: 12/339,513

(22) Filed: Dec. 19, 2008

(65) Prior Publication Data
US 2009/0160658 A1 Jun. 25, 2009

Related U.S. Application Data

(63) Continuation-in-part of application No. 12/148,177, filed on Apr. 17, 2008, now Pat. No. 7,958,155.

(60) Provisional application No. 61/011,145, filed on Jan. 15, 2008, provisional application No. 60/923,814, filed on Apr. 17, 2007.

(51) Int. Cl.
*G06F 17/30* (2006.01)

(52) U.S. Cl. .................................... 707/794; 707/903
(58) Field of Classification Search .................. 707/794, 707/803, 628, 632, 798, 999.101, 999.102
See application file for complete search history.

(56) References Cited

U.S. PATENT DOCUMENTS

| 5,835,087 | A | 11/1998 | Herz et al. |
| 5,974,417 | A | 10/1999 | Bracho et al. |
| 6,006,272 | A | 12/1999 | Aravamudan et al. |
| 6,029,195 | A | 2/2000 | Herz |
| 6,055,364 | A | 4/2000 | Speakman et al. |
| 6,154,745 | A | 11/2000 | Kari et al. |
| 6,324,584 | B1 | 11/2001 | Mandalia |

(Continued)

FOREIGN PATENT DOCUMENTS

CN 1299488 A 6/2001

(Continued)

OTHER PUBLICATIONS

Aguilera, M.; Strom, R.; Sturman, D.; Astley, M.; Chandra, T. 1999 "Matching Events in a Content-based Subscription System". Principles of Distributed Computing.

(Continued)

*Primary Examiner* — Jean M Corrielus
(74) *Attorney, Agent, or Firm* — Wilmer Cutler Pickering Hale and Dorr LLP

(57) ABSTRACT

Systems and methods are provided to enhance biometric data available to authorities to identify individuals by linking the available biometric data semantically to data from other sources to improve identity management using a semantic computing server that builds a semantic graph based on the data. Using a semantic graph helps determine the identity and possible intention to deceive of certain individuals.

20 Claims, 7 Drawing Sheets

U.S. PATENT DOCUMENTS

| | | | |
|---|---|---|---|
| 6,374,290 | B1 | 4/2002 | Scharber et al. |
| 6,421,675 | B1 | 7/2002 | Ryan et al. |
| 6,498,795 | B1 | 12/2002 | Zhang et al. |
| 6,606,744 | B1 | 8/2003 | Mikurak |
| 6,632,251 | B1 | 10/2003 | Rutten et al. |
| 6,697,824 | B1 | 2/2004 | Bowman-Amuah |
| 6,701,362 | B1 | 3/2004 | Subramonian et al. |
| 6,922,567 | B1 | 7/2005 | Rydbeck |
| 6,965,920 | B2 | 11/2005 | Pedersen |
| 7,103,527 | B2 * | 9/2006 | Rajarajan et al. ............... 703/22 |
| 7,196,712 | B2 * | 3/2007 | Rajarajan et al. ............. 345/619 |
| 7,216,179 | B2 | 5/2007 | Ott et al. |
| 7,293,109 | B2 | 11/2007 | Ott et al. |
| 7,555,563 | B2 | 6/2009 | Ott et al. |
| 2002/0004844 | A1 | 1/2002 | Harari et al. |
| 2002/0022453 | A1 | 2/2002 | Balog et al. |
| 2002/0049727 | A1 | 4/2002 | Rothkopf |
| 2002/0062300 | A1 | 5/2002 | Asadov et al. |
| 2002/0062361 | A1 | 5/2002 | Kivipuro et al. |
| 2002/0091736 | A1 | 7/2002 | Wall |
| 2002/0150093 | A1 | 10/2002 | Ott et al. |
| 2002/0174050 | A1 | 11/2002 | Eynard et al. |
| 2003/0105826 | A1 | 6/2003 | Mayraz |
| 2003/0120817 | A1 | 6/2003 | Ott et al. |
| 2004/0022453 | A1 | 2/2004 | Kusama et al. |
| 2004/0042596 | A1 | 3/2004 | Kim et al. |
| 2004/0098449 | A1 | 5/2004 | Bar-Lavi et al. |
| 2004/0122891 | A1 | 6/2004 | Meyers et al. |
| 2004/0153545 | A1 | 8/2004 | Pandya et al. |
| 2004/0243715 | A1 | 12/2004 | Yokoyama |
| 2005/0021666 | A1 | 1/2005 | Dinnage et al. |
| 2005/0071674 | A1 | 3/2005 | Chou et al. |
| 2005/0128995 | A1 | 6/2005 | Ott et al. |
| 2005/0246423 | A1 | 11/2005 | Starbuck et al. |
| 2006/0029106 | A1 | 2/2006 | Ott et al. |
| 2007/0129073 | A1 | 6/2007 | Koch et al. |

FOREIGN PATENT DOCUMENTS

| | | |
|---|---|---|
| GB | 2341700 | 3/2000 |

OTHER PUBLICATIONS

Banavar, G.: Kaplan, M.; Shaw, K.; Strom, R.; Sturman, D.; Tao, T. 1999. "Information Flow Based Event Distribution Middleware". Middleware Workshop at International Conference on Distributed Computing Systems.

Banavar, G.; Chandra, T.; Mekherjee, B.; Nagarajarao, J.; Strom, R.; Stuman, D. 1999. "An Efficient Multicase Protocol for Content-Based Publish-Subscrube Systems" International Conference on Distributed Computing Systems.

Carzaniga, A. Wolf, A. 2001 "Design and Evaluation of a Wide-Area Event Notification Service" ACM Transactions on Computer systems (19(3): 332-383, Aug. 2001.

Carzaniga, A.; Rosenblum, D.; Wolf, A, 2000, "Content-Based Addressing and Routing: A General Model and Its Application" technical Report CU-CS-902-00, Department of Computer Science University of Colorado at Boulder, Jan. 2000.

Dao, S.; Perry B.; Shek, E.; Vellaikal, A.; Muntz, R.; Zhang, L.; Potkonjak, M.; Wolfson, O. 1999. "Semantic Multicast: Intelligently Sharing Collaborative Sessions". ACM Computing Surveys.

Dao, S.; Perry, B. 1996 "Information Dissemination in Hybrid Satellite/Terrestrial" Data Engineering Bulletin, 19(3):12-18, Sep. 1996.

Devanbu, P.; Stubblebine, S.; Uschold, M. 2000. "The Next Revolution: Free, Full, Open Person-2-Person (P2P) E-commerce." Workshop on Internet-scale software Technology University of California, Irvine, California, Jul. 3, 2000.

Duda, A.; Sheldon, M. 1994. "Content Routing in a Network of WAIS Servers" 14th IEEE International Conference on Distributed Computing Systems. Poland, Jun. 1994.

Ives, Z.; Levy, A.; Weld, D. 2000. "Efficient Evaluation of Regular Path Expression on Streaming XML Data". Technical Report UW-CSE-2000-05-02. University of Washington Department of Computer Science and Engineering.

Lukose, R., Adar, E., Tyler, J., and Sengupta, C. Shock: Communicating with Computational Messages and Automatic Private Profiles. In Proceedings of the Twelfth International World Wide Web Conference. 2003.

Opyrchal, L.; Astley, M.; Auerbach, J.; Banavar, G.; Strom, R.; Sturman, D. 2000, "Exploiting IP mUlticast in Content-Based Publish-Subscribe Systems" Proceedings of Middleware.

Ott et al., "The Journey Active Network Model," IEEE JSAC, vol. 19, No. 3, pp. 527-537, Mar. 2001.

Petrovic, M. et al. "S-ToPSS: Semantic Toronto Publish/Subscribe System," Proceedings of the 29th VLDB Conference, Berlin, Germany, 2003, pp. 1-4.

Segall B.; Arnold D. 1997, "Elvin has left the building: A publish/subscribe notification service with quenching." Austrian Unix Users Group Annual Conference pp. 243-255.

Sheldon, M., 1995 "Content Routing: A Scalable Architecture for Network-Based Information Discovery", Ph.D. Thesis, MIT.

Sheldon, M.; Duda, A.; Weiss, R.; O'Toole, J.; Gifford, D. 1994. "Content Routing for Distributed Information Servers". Proceedings of Fourth International Conference on Extending Database Technology, Cambridge, England, Mar. 1994.

Sheth, A. et al., "Semantic Association Identification and Knowledge Discovery for National Security Applications," Special Issue of Journal of Database Management on Database Technology for Enhancing National Security, (L. Zhou and W. Kim, Eds.), 16(1), 33-53, Jan.-Mar. 2005.

Sheth, A. et al., "Traveling the Semantic Web through Space, Time, and Theme," Semantics & Services, Published by the IEEE Computer Society, Mar./Apr. 2008, pp. 81-86.

Sturtevant, N.; Tang, M.; Zhang, L. 1999, "The Information Discovery Graph: Towards a Scalable Multimedia Resource Directory", Proceedings of IEEE Workshop on Internet Applications (WIAPP) San Jose, California, Jul. 1999.

* cited by examiner

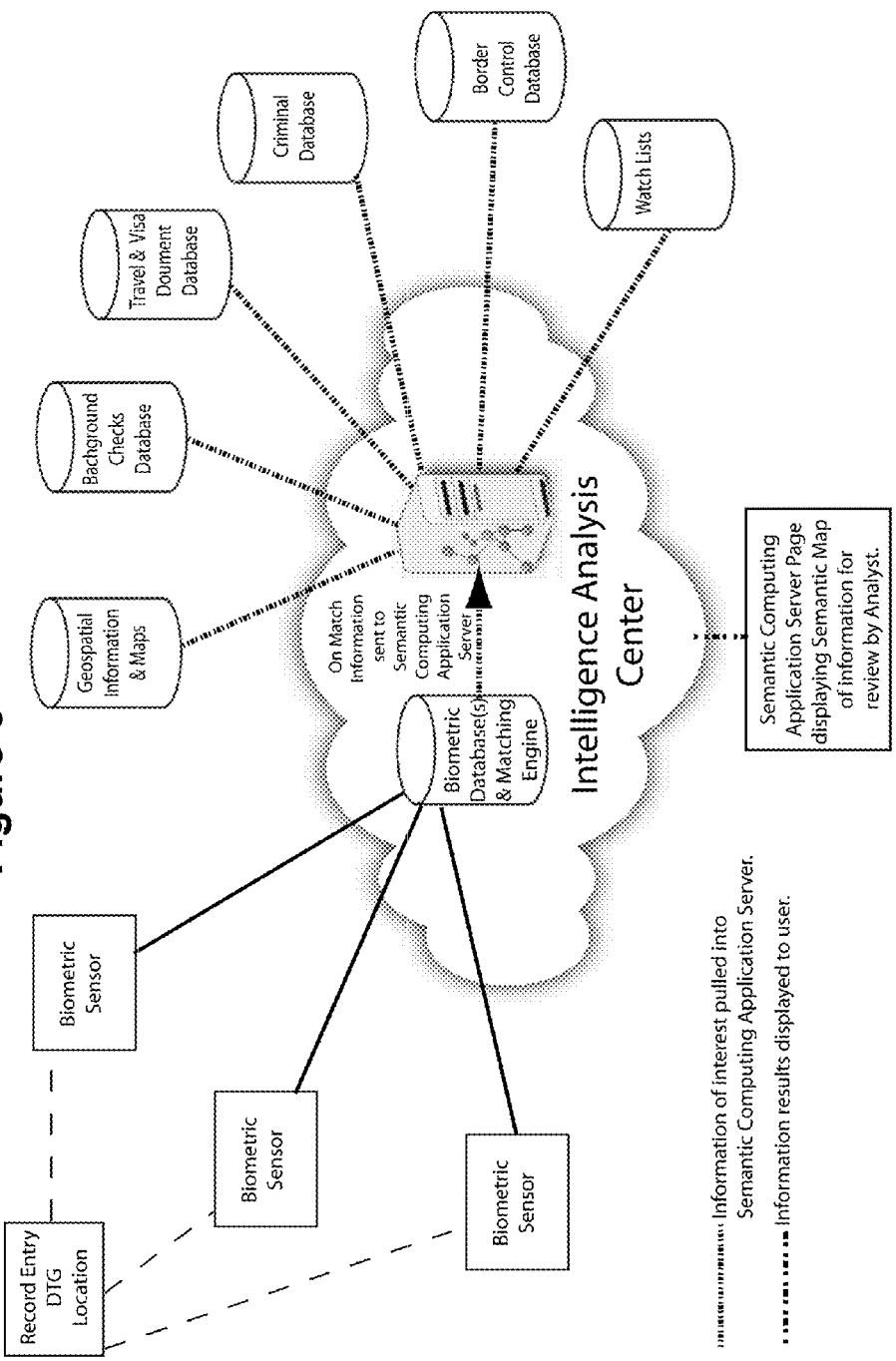

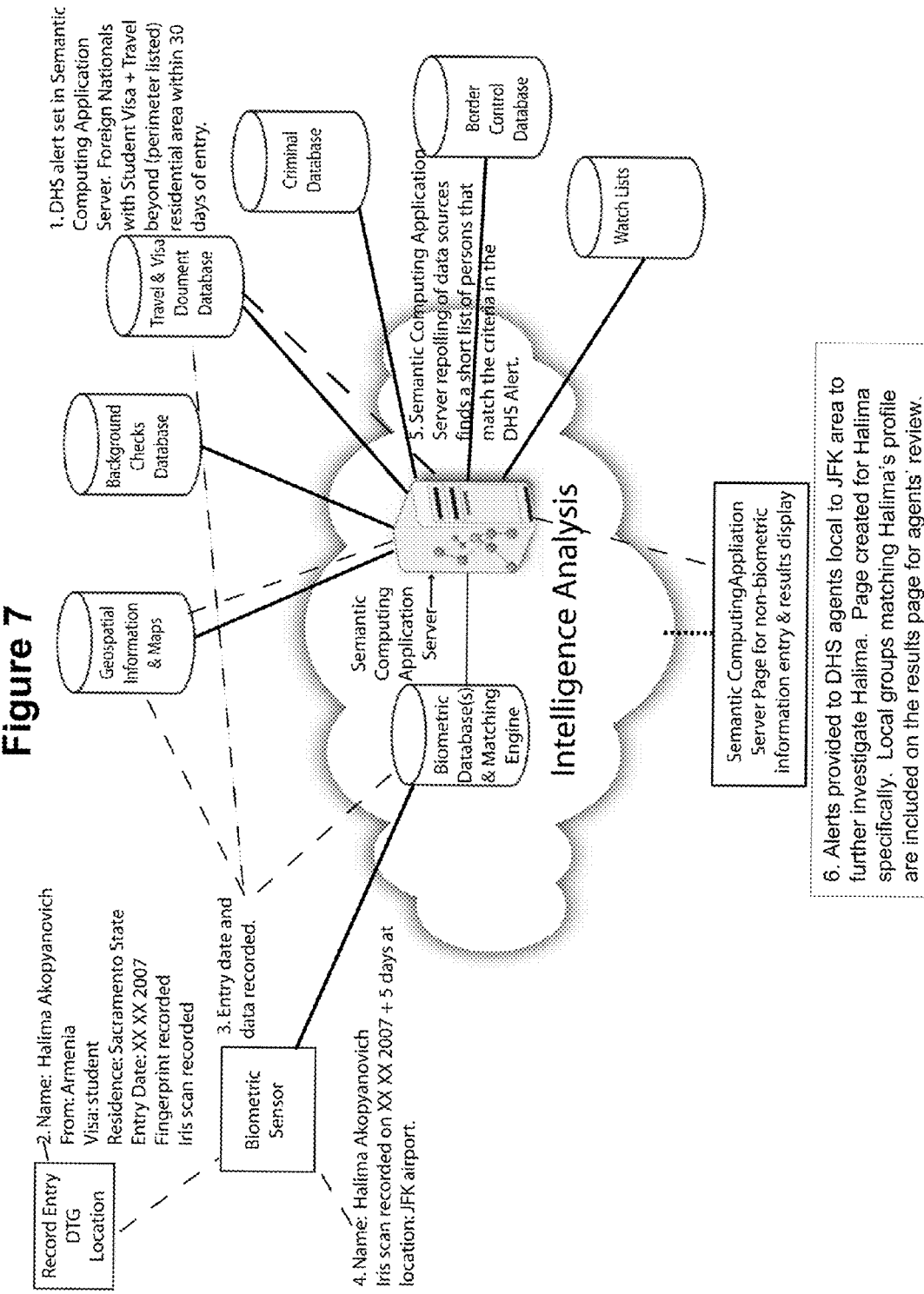

SYSTEMS AND METHODS FOR PROVIDING SEMANTICALLY ENHANCED IDENTITY MANAGEMENT

CROSS-REFERENCE TO RELATED APPLICATION

The application is a continuation-in-part of U.S. patent application Ser. No. 12/148,177, filed Apr. 17, 2008, which claims the benefit under 35 U.S.C. §119(e) of U.S. Patent Application No. 60/923,814, filed Apr. 17, 2007, each of which is hereby expressly incorporated by reference herein in its entirety. This application also claims the benefit under 35 U.S.C. §119(e) of U.S. Provisional Patent Application No. 61/011,145, filed Jan. 15, 2008, which is hereby expressly incorporated by reference herein in its entirety.

This application is related to U.S. patent application Ser. No. 12/339,506, filed Dec. 19, 2008 and titled "SYSTEMS AND METHODS FOR PROVIDING SEMANTICALLY ENHANCED FINANCIAL INFORMATION," which is hereby expressly incorporated by reference herein in its entirety.

TECHNICAL FIELD

The disclosed subject matter relates to systems and methods for building semantically enhanced identity management systems by providing on-demand access to relevant portions of a semantic graph of data, including biometric data, distributed among semantic servers.

BACKGROUND

Biometric technologies are being used today in a wide variety of applications and environments. For example, biometric sensors are used to grant access to restricted areas or resources. Law enforcement uses biometric technologies for identity assurance. Immigration and Border Protection authorities also use biometric technologies at or nearby port of entries and border crossings to verify the identity of individuals seeking to cross the borders. Although biometric information is key to identify an individual, it is only as good as the biometric information maintained by the authorities—it does not help officials to determine associations or to identify suspicious behaviors for individuals that are not in any watch list. The challenge is to bring in all relevant information that can be used to determine the identity of a person of interest that surrounds the biometric identity of a person. A gap exists in the current identity management state of the art related to adding contextual information to biometric data obtained from an individual on a per-encounter basis as an information component of a larger "person-centric" view of an individual.

SUMMARY

Semantic technologies and semantic computing approaches offer ways to correlate and associate distributed and disparate data sources to help officials understand who an individual is and if their declared intentions are legitimate. The disclosed systems and methods enhance biometric data available to authorities to identify individuals by linking the available biometric data semantically to data from other sources to improve identity management using a semantic computing server that builds a semantic graph based on the data. Using the semantic graph helps determine the identity and possible intention to deceive of certain individuals.

In some embodiments, a semantically enhanced identity management system providing a network semantic graph including concept instances and relations between the concept instances is provided. The system includes a plurality of semantic servers in communication with each other and with distributed sources. Each of the plurality of semantic servers includes a first interface for receiving biometric results from a biometric matching system that processes biometric data, wherein the biometric results include biometric data for at least one person, a second interface for receiving semantic data including semantically descriptive annotations from the distributed sources and other ones of the plurality of semantic servers, a processor programmed to process the semantic data based on the semantically descriptive annotations of the data to form a local semantic graph that associates the concept instances with each other using the relations, integrate the biometric results with the local semantic graph, and use the information stored in the local semantic graph to identify a person and memory for storing the local semantic graph. Each local semantic graph of each of the plurality of semantic servers includes a portion of the network semantic graph distributed across the plurality of semantic servers.

In some embodiments, a semantically enhanced identity management server storing a local semantic graph including concept instances and relations between the concept instances is provided. The semantic server includes a first interface for receiving biometric results from a biometric matching system that processes biometric data, a second interface for receiving data including semantically descriptive annotations from distributed sources and other ones of the plurality of semantic servers, a processor programmed to process data based on the semantically descriptive annotations of the data to form the local semantic graph that associates the concept instances with each other using the relations, integrate the biometric results with the local semantic graph, and use the information stored in the local semantic graph to identify a person and memory for storing the local semantic graph, where the local semantic graph includes part of a network semantic graph distributed among a plurality of semantic servers.

In some embodiments, A method for providing at least one client access to a network semantic graph distributed among a plurality of semantic servers wherein the network semantic graph includes concept instances and relations between the concept instances is provided. The method comprises receiving first data including semantically distributed annotations from distributed data sources in communication with the plurality of semantic servers, based on the first data including the annotations, linking the concept instances using the relations, storing the concept instances and relations as a local semantic graph including a part of the network semantic graph, receiving biometric results from a biometric matching system that processes biometric data, integrating the biometric results with the local semantic graph, creating at least one subscription of interest over the network semantic graph in response to a request from the at least one client, collecting second data from the distributed data sources based on the at least one subscription, semantically annotating the second data, updating the local semantic graph based on the semantic annotation, and sending alerts to the at least one client based on updates to the local semantic graph matching the at least one subscription of the at least one client.

BRIEF DESCRIPTION OF THE DRAWINGS

FIG. 6 illustrates a network diagram related to information matching or linked to a terrorist cell in accordance with some embodiments of the disclosed subject matter.

FIG. 7 illustrates a network diagram related to identification of an international visitor traveling on a student visa who travels far outside of is listed places of residence soon after arrival in the United States in accordance with some embodiments of the disclosed subject matter.

DETAILED DESCRIPTION

Figure 1:
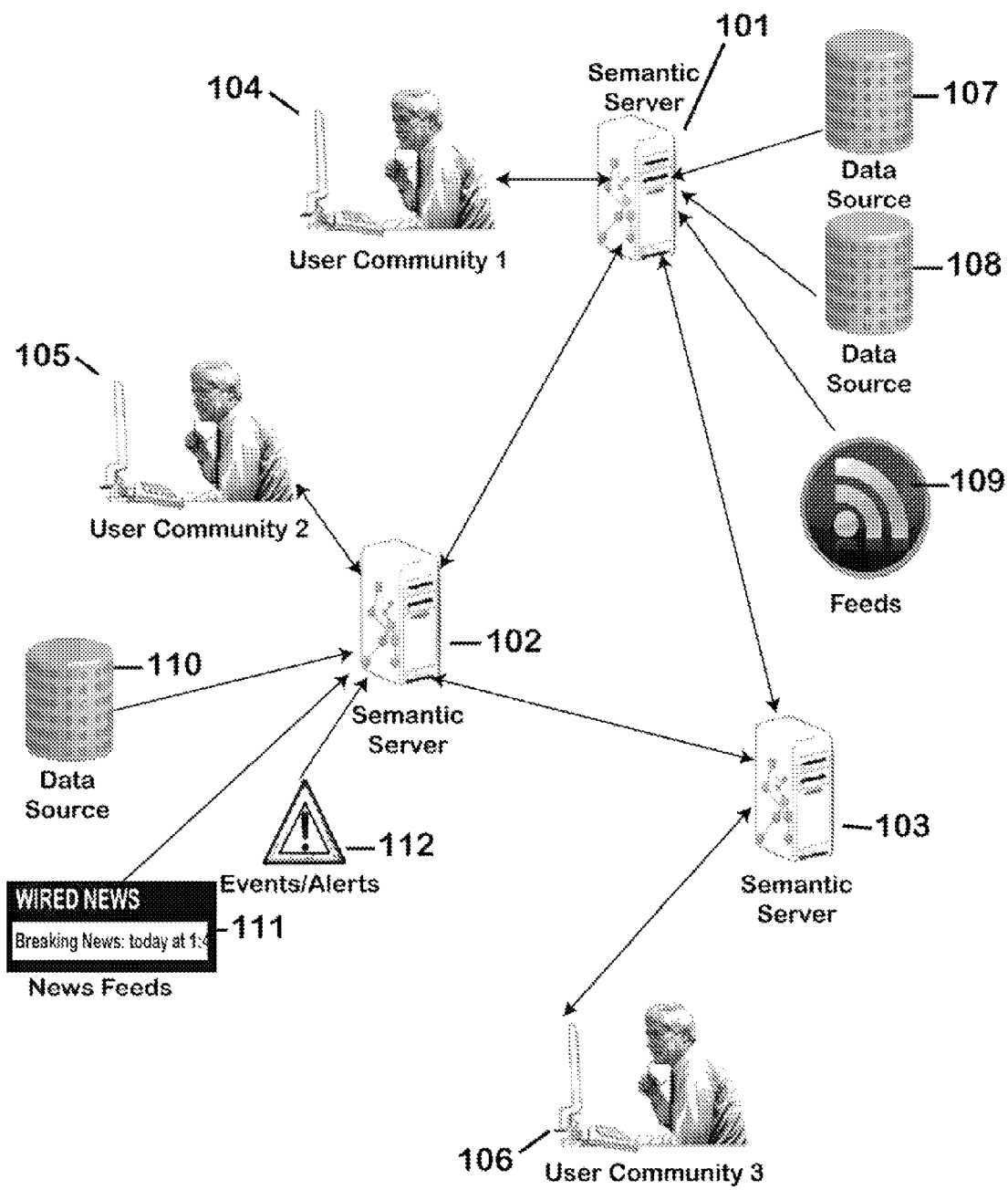
FIG. 1 illustrates an overview of a system for implementing some embodiments of the disclosed subject matter.

In the following description, specific details are set forth regarding the systems and methods of the disclosed subject matter and the environment in which the systems and methods may operate, etc., in order to provide a thorough understanding of the disclosed subject matter. It will be apparent, however, to one skilled in the art that the disclosed subject matter may be practiced without such specific details. In other instances, well-known components, structures, and techniques have not been shown in detail to avoid unnecessarily obscuring the subject matter.

In at least one embodiment, the systems and methods are a software program that uses semantically driven link analysis to analyze connected data and systems in a correlated model. The semantic computing application server is central to the system as the focal point and user interface. The system as a whole can be used for search (programmable and automatic), discovery (of patterns, anomalies, duplicate values, and previous activities) and will provide alerts as specified by the users. The system is an application of a semantic computing application server specifically enhanced for the purpose of identity management alerting, search and discovery. Due to the flexibility of this system it is multi-faceted and can be used in multiple models. The models presented in the figures are examples of one or two possible models in a multitude of modeling options.

In some embodiments, a semantically enhanced identity management system ("SEIMS") is provided that accurately identifies, locates, and provides content regarding persons, organizations, or items of interest through the merging of biometric data with other data sources and systems. The biometric data is run through a commercial third-party biometric database and matching system (a "biometric matching system"). Examples of such systems include, but are not limited, to Iris on the Move, available from Sarnoff Corporation (http://www.sarnoff.com/products/iris-on-the-move); H-Box, available from Hoyos Group (www.hoyosgroup.com); ABIS, available from Identix. (http://www.shareholder.com/identix/ReleaseDetail.cfm?ReleaseID=151705); FaceIt (http://ir.l1id.com/releasedetail.cfm?ReleaseID=208752) systems available from L-1 Identity Solutions; BAT (http://www.saic.com/news/saicmag/2006-winter/intelligencesupport.html), available from SAIC; and WISDOM Biometric Information Management System (http://www.lockheedmartin.com/news/press_releases/2007/1106_LMIriTechCollaborateToDeliv erBiometricsSolutions.html), available from Lockheed Martin. The biometric results (referred to as on-match results by the third-party companies) output by the biometric database and matching system are communicated to a semantic computing applications server. The semantic computing application server includes integration software that links biometric results to associated information from a series of data sources as it pertains to the persons, organizations or items of interest.

Example System

A semantic server can allow users to capture, annotate, link and share information based on semantic annotations on the data expressed on a common knowledge representation, called ontology. Semantic adaptors can be used to interface, for example, SQL databases, RSS feeds, Web Services, Flat Files, Web Pages (forms based posts), and real-time tracks and add or map semantically descriptive labels to the data. Semantic servers can also capture user-generated content.

In some embodiments, clients can access the semantic server by using various systems, such as, for example, a web browser or other client interface software. Applications can access the semantic server via application programming interfaces. Users and applications of a semantic server can be collectively called clients. Clients can create semantic server pages for concept instances represented in the semantic server as a semantic data model or ontology including, for example, individuals, organizations, places or events that are of interest to them. These concept instance pages can be linked through relationships declared in the ontology. The semantic server can store these concept instances and relations as nodes and edges in a semantic graph.

Clients can specify subscriptions of interest over data in the semantic graph. Based on those subscriptions, the semantic server can automatically collect the latest information from data sources coupled to it. Once the collected data is semantically annotated, it can be organized and correlated with previous data in the semantic graph. As the semantic graph changes, the semantic server can alert clients when new information comes in that match their subscriptions. The semantic servers can use commodity-computing servers and can be instantiated anywhere on a private network (intranet) or the public internet.

In some embodiments, data scalability can be improved by maintaining the distributed nature of information or copying all global information into a central repository. One way to manage the scalability issue is to use a "divide and conquer" approach where each semantic server can be specialized to subscribe to certain sections of the semantic graph and persists locally just the data with which it is in communication. Semantic servers can temporarily replicate portions of other server's semantic graphs, and then age/delete that data depending on usage by local consumers. This can provide global reach across all networked servers regardless of, for example, which server the client is locally accessing.

In some embodiments, systems, methods, and media to provide on-demand access to relevant portions of a semantic graph distributed among semantic servers and to manage the size of a semantic graph at each semantic server are provided.

A semantic server can receive data from distributed sources coupled to a plurality of servers. As data enters a semantic server, it can be processed based on its semantically descriptive annotations, forming a semantic graph that associates concept instances such as people, organizations, places and events together following a common knowledge representation or ontology. Because the associations are semantic and follow an ontology, a semantic server can know how various information elements are associated with each other.

Shown in FIG. 1 is a network of semantic servers 101, 102 and 103 in accordance with some embodiments. Each of the servers 101, 102 and 103 can include a semantic graph. A semantic graph, also known as a relational data graph or attributed relational graph, can be a data structure that encodes relationships as typed links between a pair of typed nodes. It can be a network of heterogeneous nodes and links. The nodes and link types can be related through an ontology (also known as a schema) that can include concept instances such as nodes and relations as edges. The semantic graph can be a data structure that each semantic server maintains in a relational database. In some embodiments, an example of a semantic graph can be the Internet Movie Database where the nodes can be persons (actors, directors, etc.), movies, studios, and awards, among others. In this example, each node can have a type (e.g., movie, director, producer, etc.). Each node can also be labeled with one or more attributes identifying the specific node (e.g., Shrek, Titanic, Airplane, etc.) or providing additional information about the node (e.g., gross revenues, release date, runtime, etc.). Links can also have types, for example, the (person→movie) link can be of type "acted-in" or "directed." Finally, links can also have attributes, for example, the link "acted-in" can have an attribute "year" having the value "in 2003."

In some embodiments, not every server needs to have records of all data within its semantic graph at the same time, so replicating the entire semantic graph across all semantic servers may not be desirable. In order to provide global knowledge on-demand to clients 104, 105, 106, without needing to replicate the entire semantic graph at each node semantic servers can subscribe to the portions of the semantic graph that are currently of interest to their clients at any given time. In order to provide these subscription capabilities the semantic server implements a server link interface 409 capable of forwarding portions of the semantic graph across servers on-demand without client intervention. The server link interface 409 can be an application 404 running on each semantic server.

Once a semantic server acquires a portion of the semantic graph from another semantic server, an aging algorithm can be used to age semantic graph portions that have been learned from other semantic servers. For each semantic graph node there can be a field that determines who is the originating or authoritative semantic server. The authoritative semantic server can be responsible for that concept instance as it can be, for example, communicating with the data source or communicating to the client that created that instance. Other semantic servers can "borrow" that concept instance from the parent and then age it.

In some embodiments, a user community can decide to maintain a copy of semantic graph nodes received from other servers because they can be used all the time; in other cases they may have been used a long time ago and not much lately, so they can be deleted and if needed they can be retrieved from the authoritative sever.

Figure 2:
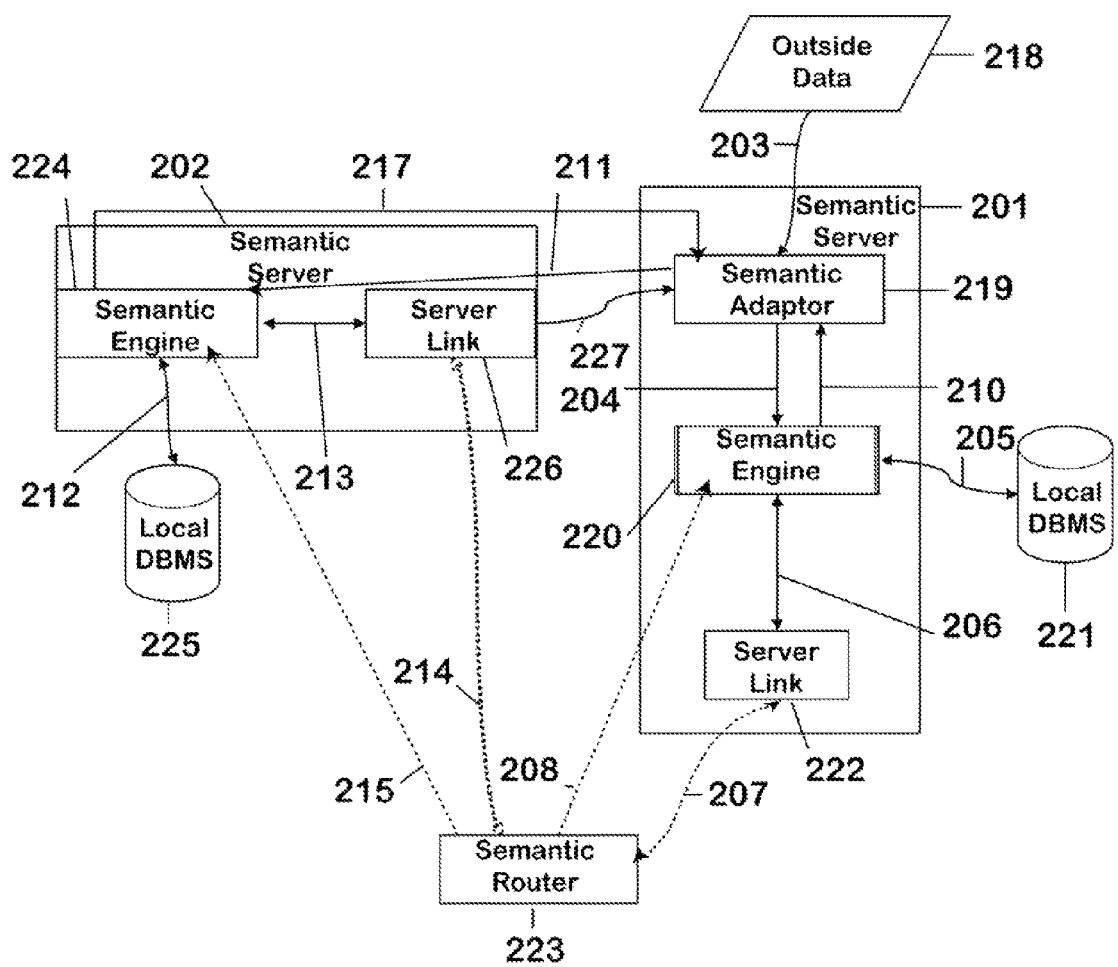
FIG. 2 illustrates the interconnection of a plurality of semantic servers in accordance with some embodiments of the disclosed subject matter.

What follows is a detailed description of the operation of a network of semantic servers where the semantic servers maintain a semantic graph that enables clients to receive actionable information as illustrated in FIG. 2 in accordance with some embodiments. Outside data 218 can be input into semantic server 201, either, for example, manually or as a result of an automated process (e.g., RSS feed, sent from another semantic server, etc.). Outside data 218 can include, for example, client data (e.g., from text extraction software, RSS feeds, etc.), and can be, for example, semantically structured. Semantic adapters 219 can process data to conform to the ontology used by the semantic server 201. In some embodiments, multiple adapters can be used, for example, if different data sources provide different types of information; each adapter can be tailored to a particular type of data source. If data already conforms to the ontology used by the semantic server (as it would if delivered from other semantic servers using the same ontology) that data can be passed to the semantic engine 224. In some embodiments, the data can be conformed with the ontology by means of a semantic adapter 219 to map the data meaning to the concepts and relations in the ontology. In some embodiments, the semantic server 201 can be designated to be an originator of outside data for semantic server 202. The semantic engines 220 & 224 can locally store processed information, adding a time-stamp to particular data to determine how recent it is. Semantic server 202 can request additional information (e.g., in response to an event triggered by data from semantic server 201, to optimize response times for future client queries, etc.) stored on other servers. Requests for additional information can be sent using any of a number of techniques, such as, for example, peer-to-peer mode across server link 226, being sent to the semantic router 223 using the server link interface 226, etc.

The information request can be passed to the semantic engines 220 & 224, which can find and compile all relevant information in the local databases 221 & 225 with which the semantic engines 220 & 224 interface. The semantic engines 220 & 224 can retrieve the requested information from the databases 221 & 225. The information retrieved by the semantic engines 220 & 224 at semantic server 201 can be sent to semantic server 202 and input into the semantic adapter 224 in, for example, the same manner that other local data sources are in communication with the semantic server 202.

The semantic server 202 can use a local database management system 221 & 225 to store and retrieve information efficiently. Various database management systems can be used, such as MySQL, Oracle, PostgreSOL, Microsoft SQL Server, etc., and depending on which system or systems are used, slightly different implementations of the processes in the semantic engine 220 & 224 can be used. In some embodiments, a local database can only contain a portion of the overall (distributed) semantic graph. The server link 222 & 226 can implement the interface used to communicate with other semantic servers over a network. It is also possible in some deployment scenarios, for example, to network the servers by means of server link implementations in a peer-to-peer configuration.

A semantic router 223 can be used to provide high performance routing of information across a network that is directing information requests and responses made through the server link interface 222 & 226 to the semantic server 201 & 202 containing the appropriate information. The router, can be, for example the router described in U.S. Pat. No. 7,216,179, entitled "High-Performance Addressing And Routing Of Data Packets With Semantically Descriptive Labels In A Computer Network," which is owned by the present assignee, and the disclosure of which is expressly incorporated by reference in its entirety herein.

A Semantic Server in Accordance with Some Embodiments

Figure 4:
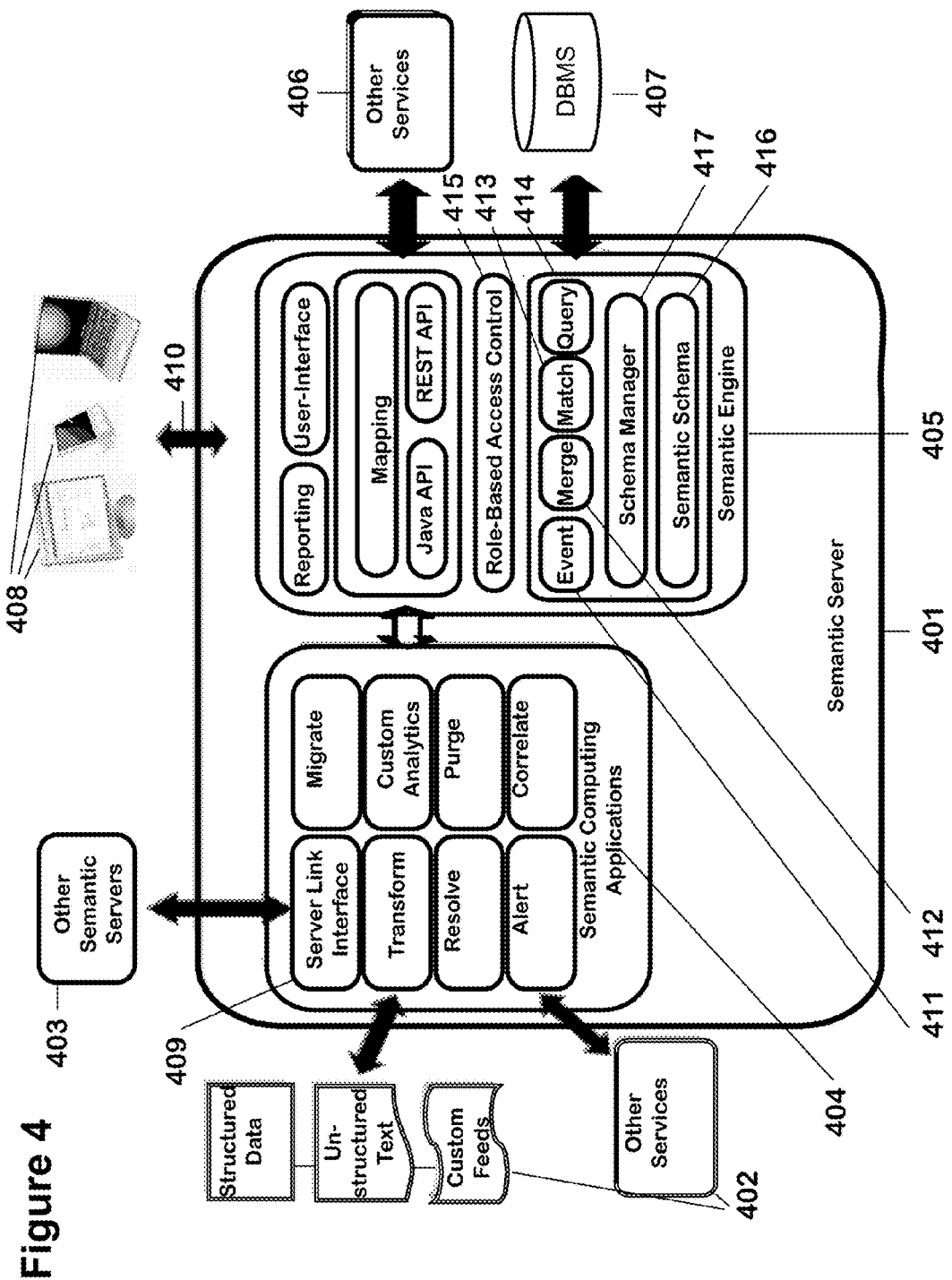
FIG. 4 illustrates an overview of a system for implementing the semantic server components for some embodiments of the disclosed subject matter.
Figure 5:
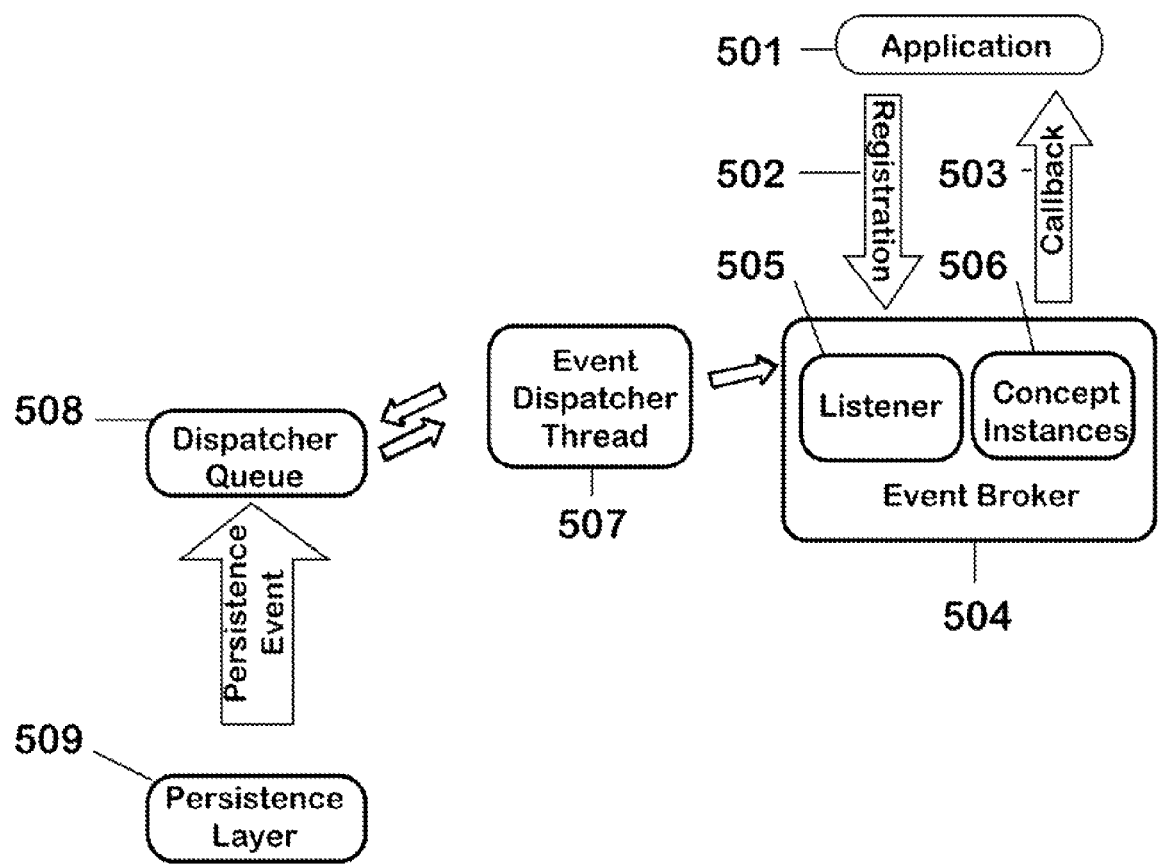
FIG. 5 is a flow diagram showing some embodiments of event management within the semantic server of some embodiments of the disclosed subject matter.

A software architecture of a system in accordance with some embodiments is illustrated in FIG. 4 as an overview of its applications, components, services and interconnected diagrams, includes a semantic engine 405 and a semantic server schema 416.

Semantic Engine 405

The semantic engine can perform the following functions: data matching 413 combining new data into matching concept instances already in the semantic graph; data merging 412 which merges information across subscriptions; and event management 411, which monitors and responds to changes in the semantic graph; and query 414, for finding information already in the graph.

Figure 3:
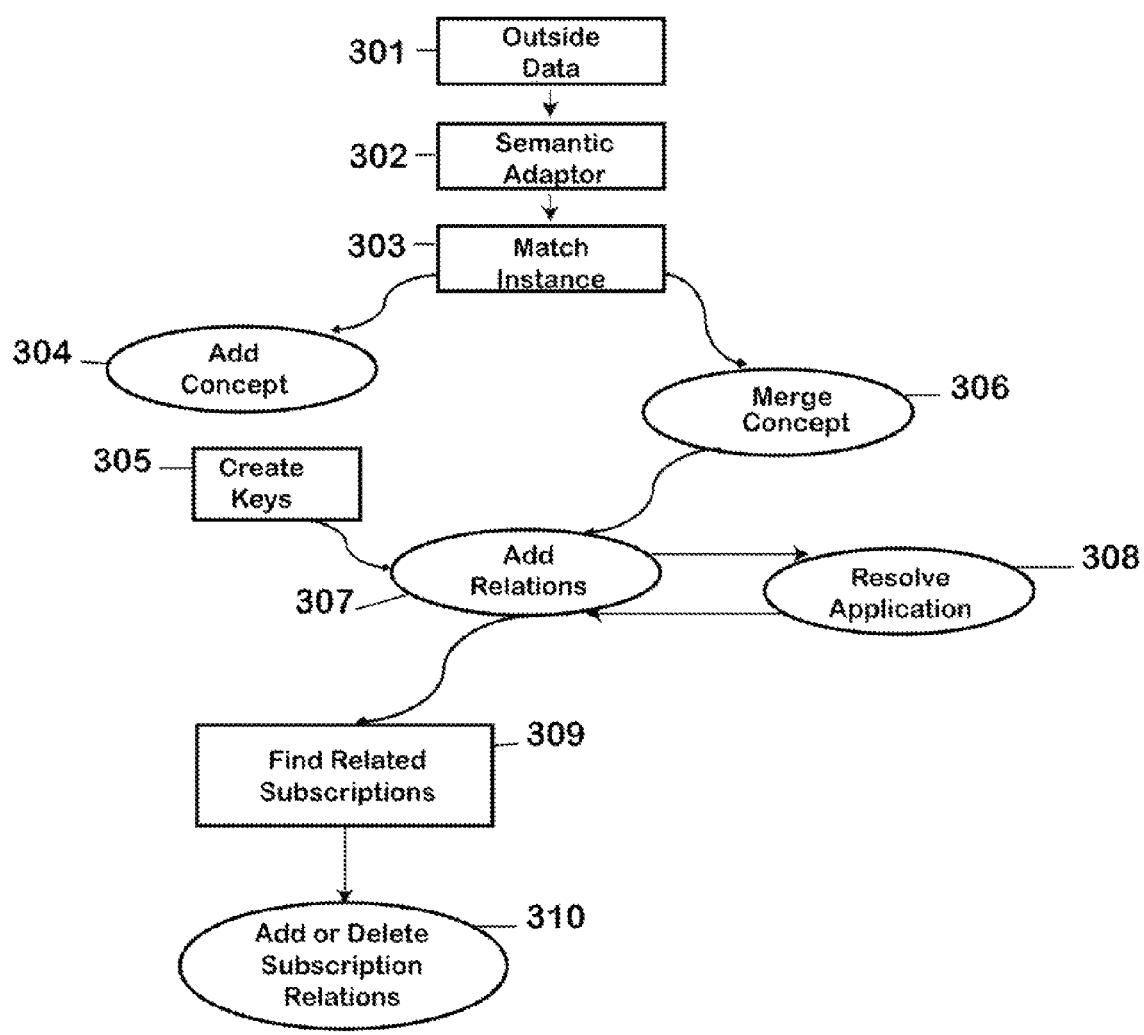
FIG. 3 is a flow diagram showing one example of the semantic server in accordance with some embodiments of the disclosed subject matter.

FIG. 3 illustrates a data flow process within the semantic engine impacting upon the semantic graph in accordance with some embodiments. It follows outside data 301 being processed 302-309 and at the subscription level 310. The data can enter the semantic engine 405 through the semantic adaptor 302. Match operation 303 can include inserting and/or updating concept instances, properties and/or relations in the semantic graph. The match process can be governed by rules which can be maintained as part of the schema. If the concept instance is not already in the graph, it can be added through the add concept 304.

Keys 305 can be constructs used by the match engine to determine whether and when new information is merged with existing information. Keys can be composite (e.g., including multiple properties) and have match rules which can include complex and/or fuzzy logic. If the data entering the semantic engine conforms to a concept instance already in the graph, any new information can be added to that concept instance. Keys 305 describe to the matching process 303 which particular properties in the match engine can be updated and the manner in which they can be updated. Based on this process, additional associations 307 can be created and if so can be added to the semantic graph according to the predefined ontology that defines concepts and relations 307. The semantic server can derive additional information not explicitly stored in the semantic graph by means of executing expressions that operate on the semantic graph data. For example, a portion of a semantic graph tracking the details of a phone call: the semantic server can derive a relation between two persons called "CommunicatesWith" having a given strength based on the number of calls involving telephones "OwnedBy" those persons.

The semantic engine can query the graph to determine which currently available subscriptions are related to the new concept instance 309 and what relations have been provided by this process 304, 306 and 307.

The information about relevant subscriptions can be used, along with the logical composition of different subscriptions, to determine whether a concept instance has a relationship with a subscription 310.

A Semantic Server Schema in Accordance with Some Embodiments

The semantic server 401 can employ a client-defined schema 416 to organize information stored within it. The schema 416 can include four components: concepts, properties, attributes and relations.

Concepts can represent persons, places and things in the real world. A concept instance can, for example, represent a single, specific person, such as George Washington, place or thing, or can represent a set of persons, places or things.

Properties can represent descriptive elements of concepts, such as, for example, the color of a person's hair, the latitude of a place, or the weight of an object. Properties can be typed, that is, the kind of data stored in a property is restricted to a specific type, such as integers, real numbers or character strings. Attributes can represent data about properties (metadata), and can be used for a variety of reasons within the semantic server such as tracking the last time a property was updated or specifying where the property will appear on a page in the server's user interface (presentation directives). The schema can support multi-valued properties, so that different sources can, for instance, report different hair color for George Washington if they have different information. This can be used, for example to support collaborative groups. User communities can decide how to handle conflicting information (either manually or automatically). Source attribution can be associated with each piece of information to its source, so, for example, the server can store the fact that Joe Analyst reported the color of George Washington's hair as being white.

Relations can represent meaningful associations between concepts. Relation instances can connect specific concept instances. For example, a relation Is_Married_To between two instances of the concept Person can be used to associate George Washington with Martha Washington. The Is_Married_To relation is not defined between Person and Automobile, for example, because that relation doesn't have meaning in the real world. A relation set can be a mechanism by which similar relations, such as George Washington Is_Married_To Martha Washington, reported by multiple sources, can be grouped together and treated as an entity. Rules for defining how specific relation sets are treated are defined in the schema.

Special Semantic Constructs in the Schema in Accordance with Some Embodiments

Because the semantic server can use the schema to control its operation, certain constructs specific to the operation of the server are included in the schema.

Schema Manager 417

The schema can be maintained in a semantic graph. Just as the data can have a concept instance for George Washington, the concept Person also exists as a concept instance in the semantic graph. Clients can manipulate the schema through a user interface. Transforming data between different schemas can be handled through the use of applications which modify the data appropriately. Depending on, for example, the implementation of the applications and/or the specific transformation being conducted, the semantic server can continue operation even while the schema is being transformed.

Supporting Evidence in Accordance with Some Embodiments

Concepts in the graph can be used as supporting evidence for other assertions including concept, property and relation instances. For example, a passport can serve as supporting evidence of a relation between an individual and a country, or an intelligence bulletin can serve as supporting evidence for an individual listed on a watch list. In addition, relations can have additional properties, such as degree and certainty, for specifying the strength, or affinity of two concept instances and the confidence in the relation's existence, respectively. In some embodiments, all data can be attributed to its source, whether it was a human user or data automatically entered through an application.

Subscriptions in Accordance with Some Embodiments

Subscriptions can be created by clients to indicate what they are interested in receiving information regarding and or alerts on. Within the semantic server schema subscriptions can be dynamic sets of concept instances in which each member conforms to some client-specified criteria. For example, a client can create a subscription for all Persons, all Persons having red hair, all Persons who are Members Of any organization, a specific organization, or Persons whose height is greater than 6', etc. Property and attribute value criteria can include operators, such as equals (=), starts with, contains, greater than, sounds like, etc. Subscriptions in the semantic server can be dynamic, in that, for example, new information can be routed to applicable subscriptions as it enters the semantic server, and a set of concept instances that belongs to a subscription can be constantly maintained. Set membership need not be recomputed each time a client requests the members of a subscription. Complex subscriptions can be created by chaining subscriptions together using logical operators. The section below entitled "Subscription Implementation and Semantic Applications in Accordance with Some Embodiments" can be reviewed for a more complete description of how subscriptions operate as well as their use in decision making processes supported by the semantically organized data.

Role-Based Access Control (RBAC) 415 in Accordance with Some Embodiments

User access privileges as well as concept, property and relation permissions can be stored in the semantic graph, providing fine-grained access control to specific concept, property and relation instances as well as coarser-grained access control based on the schema. In other words, permissions can be established at the concept level (e.g., Person) or on a per-instance basis (George Washington), or at the property (Person.name) or property instance level (George Washington.name). Access control can be managed within the semantic core which prevents unauthorized access.

Semantic Computing Applications 404 in Accordance with Some Embodiments

Semantic applications written to interface with the semantic server are represented in the semantic graph and are managed by system administrators through the user interface. Such applications have access to the event handling process used by the semantic server, which can allow them to dynamically respond to changes in the underlying data. Management can include, for example, stopping and starting applications as well as setting configuration properties.

An Example of a Semantic Computing Application 405 in Accordance with Some Embodiments Server Link Interface 409 provides network functionality for using semantic information distributed between multiple servers. This interface can implement services to determine the kinds of data available for integration from other servers and allows for the efficient transfer of that information from the database management systems of remote servers into the semantic engine.

Subscription Implementation and Semantic Applications in Accordance with Some Embodiments Subscriptions can allow clients to be notified of information changes of interest on the semantic graph. Subscriptions can be baselined or can be chained together to create dynamic subscriptions with high-order set constraints. The elements at the intersection of those sets can satisfy the constraints and can be of interest to the clients; as a result, client-defined actions including notification or subsequent processing can be initiated.

Clients can define subscription sets and change them as needed without changing the underlying ontology. For example, a subscription for males taller than 6' belonging to AAA can be chained with a subscription for people attending a class reunion at a Thomas Jefferson High School. The results at the intersection of both sets are instances of males taller than 6' belonging to AAA also attending the function. Additionally, this can allow subscriptions themselves to be represented as small schema, providing partially instantiated portions of the semantic graph to match structurally similar subscription schema and create events against this complex subscription type.

Persistent Logical Operations in Accordance with Some Embodiments

Subscriptions (set descriptors) can also be part of the semantic graph, so new content is attached to matching sets or removed from sets when it no longer matches as new information comes into the semantic server. Accordingly, subscriptions can be dynamically updated to reflect the actual state of data.

Examples Of Baseline Subscriptions In Accordance With Some Embodiments

All X such that X IsA [typeOfConcept], where typeOfConcept is a class name, or concept name, such as Person, Facility, or Hospital. Subscriptions in the semantic server are always constrained in this manner, thus set membership is always homogenous by type.

All X such that X.propertyname [operator] [value], where property name is an attribute (property) of a concept, such as name, height, or hair color; operator is a comparator function, such as equals, greater than, or less than; which is used to compare the property value of each candidate member to the value provided in the subscription. Examples of this kind of subscription are: Person.height>60", or Person.name contains 'smith'.

All X such that X [relation] Y, where relation is a relation that is valid between concepts of type X and concepts of type Y, and Y is a specific concept instance. The relations that are valid between any two concept types are defined in the ontology and enforced by the semantic server. An example of this kind of relation is: Facility LocatedIn Place.name='Trenton'. In the semantic server, this subscription will match facilities that are geo-located within the polygon that describes Trenton as well as facilities that have an explicit LocatedIn relation to Trenton.

All X such that X [anyRelation] Y, a variation of the above in which any X that has any kind of relation to Y will be returned.

All X such that X [relation] Set "S", where set S is a list of members of a subscription.

The certainty with which a property value or relation is known varies, and a semantic server can provide native support for probabilities on both properties and relations. Consequently, we can capture information such as: Person has hair color="Brown" with =80% certainty, Person IsMemberOf Organization Y with <75% certainty and Person X IsSameAs Person Y with >50% probability.

Dynamic Subscriptions in Accordance with Some Embodiments

In some embodiments, subscriptions can continuously maintain information about the data meeting certain logical criteria and the criteria themselves can also be dynamic. For instance, a subscription can look for all "bird sighting" concepts with relation "near" a specific "Car" concept (e.g., a particular VIN#). This is qualitatively different from subscribing to a list of all bird sightings near a particular location because a car moves. In particular, the location value for the car can be updated at regular intervals, which can automatically trigger re-computation of the concepts that match the subscription at each update. Similar reasoning applies to subscriptions conditioned on time-based relationships (e.g., within 2 weeks of), since set membership depends on a moving variable. By allowing dynamic subscriptions in this way, the semantic server can retain data lost by typical query methods and can allow analysis not only to present states but also of the past development of different concepts.

Using Subscriptions to Abstract Information in Accordance with Some Embodiments

One application of subscriptions, combined with certain kinds of applications interfacing with the semantic server, can be to provide abstracted information about the current state and the development of sets of objects over time. Examples of the abstracted information can include a histogram of the time of day at which a particular event is likely to occur, or the typical duration of a given event. If a new event matches the logical requirement of a subscription but is a poor fit with observed information, this can cause the event to receive more thorough scrutiny. The event's low probability may mark a change in what is considered "typical". The current nature of subscription information means that events identified as "outside the norm" in this manner are identified quickly enough to enable action to be taken, whereas a query based system may not be able to consistently identify this kind of information as queries retrospectively assemble relevant data.

Semantic Server Interface in Accordance with Some Embodiments

External clients can interact with the semantic server using various application program interfaces to extract data from the server and to insert data into the server and can be used to customize requests for data including any concept, property or relations of interest from the semantic graph on the semantic server. Among the many possible APIs are a Java API and a Representation State Transfer (REST) API. The Java API provides a rich Java-language interface to the semantic server, including event management interface. The API requests and responses can be formatted in several different formats as would be understood by one skilled in the art, which can include but are not limited to XML, JavaScript Object Notation (JSON), Keyhole Markup Language (KML), etc. KML is the format used by Google Earth and Google Maps to manage the display of geographic data in an application. KML uses a tag-based structure with nested elements and attributes and is based upon the XML standard. See http://code.google.com/apis/kml/documentation/ for KML documentation.

Examples of a REST API in Accordance with Some Embodiments

Examples of requests and responses to a semantic server using a REST API in accordance with some embodiments:

1) This request is a basic request searching for all people with "red" hair and "blue" eyes performed over the semantic graph on the semantic server (labeled mysemanticserver on the formatted REST URL below.

```
{
    "query": {
        "concept": "Person",
        "eyeColor": "blue",
        "hairColor": "red"
    }
}
http://mysemanticserver.myorg.com/api/search?query={"query":{"concept":"Person","eyeColor":"blue","hairColor":"red"}}
```

2) This requests adds to the previous specifying all people with "red" hair and "blue" eyes, married to a person with name containing "Smith".

```
{
    "query": {
        "concept": "Person",
        "eyeColor": "blue",
        "hairColor": "red"
        "relations"; [{
            "relation":"MarriedTo",
            "object": {
                "concept":"Person",
                "name":"~= smith"
            }}]
    }
}
```

The formatted REST URL for the above query to the semantic server is as follows: http://mysemanticserver.myorg.com/api/search?query={"query":{"concept":"Person", "eyeColor":"blue", "hairColor":"red", "relations":[{"relation":"MarriedTo", "object":{"concept":"Person", "name":"~=smith"}}]}}

3) This new request asks that incidents reported within a geographic area defined as a bounding box defined by the four points at the intersection of the pair of longitude and latitude coordinates specified.

```
{
    "query": {
        "concept": "Incident",
        "relations"; [{
            "relation":"LocatedAt",
            "object":{
                "concept":"Point",
                "properties":[{
                    "name":"lat"
                    "value":"><30.0222334 45.554333234"
                },{"name":"lon","value":"><110.3772284 120.0432934"
            }]
        }
    }]
    }
}
```

The formatted REST URL for the above query to the semantic server is as follows: http://mysemanticserver.myorg.com/api/search?query={"query":{"concept":"Incident", "relations":[{"relation":"LocatedAt", "object":{"concept": "Point", "properties":[{"name":"lat", "value": "><30.0222334 45.554333234"},{"name":"lon", "value": "><110.3772284 120.0432934"}]}}]}}

4) This request can go hand in hand with the previous request regarding incidents reported within a geographic area and queries which government facilities are located within that geographic area or bounding box.

```
{
    "query": {
        "concept": "GovernmentFacility",
        "relations"; [{
            "relation":"LocatedAt",
            "object":{
                "concept":"Point",
```

-continued

```
        "properties":[{
            "name":"lat"
                "value":"><30.0222334 45.554333234"
            },{"name":"lon","value":"><110.3772284
            120.0432934"
        }]
    }
    }]
    }
}
```

6) This is another call for information regarding a defined location-a geographic area or bounding box and items within that framework, in this case Webcams.

```
{
    "query": {
        "relations": [ {
            "relation": "LocatedAt",
            "object": {
                "concept":"Point",
                "properties":[{
                    "name":"lat",
                    "value":"><30.0222334 45.554333234",
                },{
                    "name":"lon",
                    "value":>< 110.3772284 120.0432934"
                }]
            }
        }]
    }
}
http://mysemanticserver.myorg.com/api/search?query={"query":{"concept":"Webcam","relation
s":[{"relation":"LocatedAt","object":{"concept":"Point","properties":[{"name":"lat","value":"><
30.0222334 45.554333234"},{"name":"lon","value":">< 110.3772284 120.0432934"}]}}]}}
```

The above is the formatted REST URL for the query to the semantic server.

Example Enhanced Identity Management System

SEIMS is an application of the semantic computing application server software specifically enhanced for the purpose of identity management, search and discovery. The user, which can be, for example, a customs and immigration agency or organization, can customize their own semantic computing application server based on their specific interests by uploading bulk data, creating pages of interest, connecting to data sources and feeds that will update those pages of interest and setting up notifications and alerts. Connecting to biometric sensors and the biometric database matching engine provides yet another source of information that can assist them with identity management.

The semantic computing application server included as part of SEIMS is part of a larger network that includes biometric systems (including sensors/hardware, software and data networks in themselves), maps and other geo-location databases/information and information databases/lists.

Biometric systems that can be integrated into SEIMS include but are not limited to:
 fingerprint scanning systems
 facial recognition systems
 iris identification systems
 hand geometry systems
 palm scanning systems
 signature/handwriting analysis systems
 voice imaging/mapping systems
 3D facial/movement reconstruction or identification systems
 photo/video enhancement systems
 sound extrapolation/modification/matching or identification systems Data-sources and databases which can be integrated into or polled against SEIMS include but are not limited to:
 Travel document databases (visa and passport information, locations of residence, purpose of entry, etc.)
 Border control information
 Airport security information (trusted traveler, employee information, etc.)
 Drivers' license databases
 Time and location information (various sources such as flights, mass transit i.e. buses/trains)
 Transportation databases
 Facilities management access control systems
 Civil and criminal background investigation information
 Watch lists with associated information
 Maps and other geospatial information reference databases (political, criminal, and socio-economic location data sources)
 Organization databases
 Health care providers and emergency management databases SEIMS can produce a variety of alerts and responses as varying as the users who access the network. It can provide different types of alerts based upon user needs. For example, in local law enforcement an alert can be directly sent to all patrolling officers, patrol cars, and stations in the manner most appropriate. The alerts can be sent discretely to only members of a specific team. For example, in the event that an iris scan identifies an incoming foreign national as a member of a terrorist group, the officer/agent at hand and only those officers/agents who can assist would be notified discretely and immediately. In this case it would be counter-productive to notify all connected officers/agents.

SEIMS can be used more specifically as an analysis tool in which case a semantic graph of connections among individuals, locations and relationships might be the information provided. With a semantically enhanced system a variety of alerts and responses can be provided driven by user needs.

The semantic computing application server adds relevant information to those persons of interest to provide a much fuller picture with previous history and associated information.

This application can be used, for example, in the following several arenas, for example: Homeland Security, Federal and Local Law Enforcement, U.S. Coast Guard. SEIMS provides accurate identification coupled with associated relevant information and alerts when defined suspicious indicators are met. This is accomplished by accessing relevant information available from various connected data-sources including biometric data. Displays of positive identification matching interested subjects would also show relevant data and, if programmed, generate alerts.

The purpose for using this application would vary according to the needs of the user and the information available. For example, consider a border crossing or port of entry where an iris scanning sensor is used. On its own, an iris scanning sensor (such as those identified above for biometric database and matching systems) will scan 20-50 people per minute per sensor. The results would be matched to the national watch list and the outcome logged into a database along with the date, time, location and record identifier. At this point the customs and immigration officer would have just identified a group of people at a specific location and time that either match or do not match the national watch list. The officer who wants more information on certain person of interest beyond the biometric data he or she collected, can use the semantic computing application server to find the answers to the next leading questions such as where is that person going to, with whom and for what purpose, etc.

More Examples Follow.

Purpose Example 1

Example of User Agency is the Department of Homeland Security

Process: Information obtained from foreign national entry into the U.S. is compared to information already on file immediately and again as external information is collected.

Background: Information is provided by individuals entering the U.S. from foreign nations. A foreign national must present a passport, visa and a completed I-94 form upon entry into any U.S. airport from an international flight. This information presents the biometric information of a picture (possible facial scan), a fingerprint from the passport and additional information such as a name, purpose for visiting the country, where they will stay and where they might travel. This information is entered into a database that SEIMS polls against on a routine basis.

The entry process fingerprint scan and/or an iris scan of the person entering is run through SEIMS. If the information has previously been entered any prior information would be provided to the immigration officer for reference—confirmation or conflict notice. If no entry has previously been received the information would be stored for future use.

Sample Scenario 1: Identifying operatives of a terrorist sleeper cell with SEIMS. SEIMS helps identify persons of interest based on travel patterns, nationality, biometrics, common visa information for purpose of travel.

Referring to FIG. 6 for illustration purposes, Immigration, Customs and Export (ICE) is specifically interested in all persons and associates of the Buffalo 6 and Jaber A. Elbanah. There has been information that another sleeper cell is aiding al Qaeda in the upstate NY, specifically the Buffalo area. They are referring to their group as another Buffalo 6 and have identified a foreign national entering the U.S. as their new Jaber A. Elbanah.

Day 2 of the investigation—agents in charge create several semantic computing application server pages with the information from the original Buffalo 6, Jaber A. Elbanah and multiple suspects in upstate New York. Alerts for various matches are set—specifically biometric matches for Yemeni nationals and matches for all suspects entering or departing airports within a five hour travel distance from the Buffalo vicinity are set to alert ICE agents.

An international flight at JFK airport brings in several Yemeni nationals. Their iris/fingerprint scans are recorded as well as their passport information and their expected residence. None list travel to or residence within the Buffalo area.

On Day 7 of the investigation, one of the suspects from the New York area is picked up through iris scan as departing the Buffalo airport. An alert notifies ICE agents. Agents review flight information for that time period. The review does not show that the suspect took a flight. Agents assume the suspect picked up another person from a flight that day. Two Yemeni nationals were also recorded as departing the Buffalo airport that day within three hours of the suspect's departure. Neither Yemeni national listed travel to Buffalo on their entry form. Rather, both list business as their reason for entering the U.S. and site the same conference in Chicago.

These alerts help the agents in charge to determine that this suspect may have transported the Yemeni nationals, one of whom may be the cell's new Jaber A. Elbanah.

SEIMS would be useful in focusing this investigation as well as aiding in the identification of the terrorist sleeper cell and their international accomplices.

Sample Scenario 2: Identifying suspicious traveling patterns matching intelligence indicators with SEIMS. Biometric data enhanced with contextual information from visa type, travel purpose, background checks alerts officials of suspicious pattern.

Referring to FIG. 7 for illustration purposes, the Department of Homeland Security (DHS) receives a detailed profiling report that identifies international visitors traveling on student visas who travel far outside of their listed places of residence soon (one month or less) after entry into the U.S. as those with the highest probability of being involved in illegal activities.

Acting upon this information, DHS agents create a page with alerts for DHS agents in semantic computing application server that requests alerts for those foreign nationals traveling on student visas who arrived less than 30 days prior to traveling to a destination more than six driving hours from their expected place of residence.

Day 1: Several pages are created for known terrorist cells in various locations and their means of operation, background, nationality, etc.

Day 45: A woman in her early 20s enters the country from an international flight at Los Angeles International Airport under the name Halima Akopyanovich from Armenia. She is traveling on a student visa and documentation verifies her status as a graduate student at Sacramento State in California. Her iris scan and fingerprints are recorded. No alerts are presented at the time of entry as this is a new entry.

Day 50: The iris scan at JFK airport the Wednesday of the following week picks up Halima Akopyanovich departing from the airport. As this was far outside of the location she listed as her place of residence this triggered an alert through SEIMS. This alert was provided to DHS agents local to the JFK airport. Her name is on a short list of alerts.

Day 55: Agents create a page for Halima in semantic computing application server with all known data and review possible links to known and suspected groups in the area based on information such as nationality, religion, etc.

Day 60: A DHS investigation reveals that Halima did not report to any classes. A more detailed background investigation begins and finds that the existence of Halima Akopyanovich in Armenia can not be confirmed. She is tracked to a suspected terrorist cell outside of NYC. As an indication of new activity this suspected cell is being closely watched for the moment.

In this case, the SEIMS alert would automate what might otherwise be a lengthy and time consuming process; it provides a clearly shorter list of suspicious persons to investigate. It also provides links to possible associations/groups in the area based on known information such as nationality, religion, etc.

Purpose Example 2

In this Example, the User Agency is Local/Federal Law Enforcement

Process: Information obtained from criminal databases, crime scenes, fingerprint databases and recent iris scan databases. Information from a crime scene is collected and analyzed. Pages in semantic computing application server are created with pertinent information and a search is set for information related to crime scene information such as fingerprints, eyewitness reports, eyewitness descriptions and the method(s) of the crime are included in the details of a new case. Certain information matches are set to alert appropriate authorities. For example, matches to fingerprints, facial recognition scans, automobile information (license plate numbers of car descriptions) are automatically set to alert police officers and/or FBI agents that this matches on ongoing investigation—with investigation details as appropriate. This type of alert helps quickly link crime scenes and other valuable data creating connections that can lead to the discovery and apprehension of suspects very quickly.

Sample Scenario 3: SEIMS provides contextual supportive intelligence on a forensic investigation Day 1: The FBI is investigating the kidnapping of an infant child and the murder of the child's mother in rural Pennsylvania. The crime scene yields evidence of fingerprints and DNA evidence. While there is no match for the fingerprints, the DNA evidence shows the presence of two assailants—one male and one female, the male is the child of the female. Neighbors witnessed a well dressed woman in her 40s, heavy build, medium height with brown hair and light skin on the porch the day of the attack. They saw a white Chevrolet Cavalier recent model but did not see any plate numbers.

Day 2: Agents create several pages in semantic computing application server listing information about the murder, kidnapping, crime scene details and witness information. They set alerts for specific information such as: matches to the fingerprints, matches to the DNA evidence, matches to the make and model of the car and description of the woman seen by neighbors on the day of the attack.

Day 2: SEIMS generates an alert with associated details to all law enforcement to be on watch for the following suspected in murder/kidnapping.

Day 3 AM. A convenience store is robbed; the security camera shows a white Chevrolet Cavalier with Ohio plates, the fingerprints match the prints from the murder/kidnapping scene. This information is quickly matched to the murder/kidnapping scene.

Day 4: The FBI is able to secure the name of the owner of the vehicle find the driver and her grown son, obtain a warrant for the woman's home to find the assailants and the infant.

In this instance, SEIMS rapid alerts tied to fingerprint evidence quickly links the two criminal events providing more information and allowing the agents to quickly find the assailants.

Sample Scenario 4

Day 1: Local law enforcement in Long Island, N.Y. is investigating a string of home invasions. Officers create pages in semantic computing application server with information from the series of crimes. Related pages are linked as well including pawn shops that have sold stolen materials from the crimes. Pages on victims and methods are also recorded in semantic computing application server.

Day 3: Security cameras from the latest crime scenes picked up the picture of one of the assailants partially unmasked face upon exit from the home. This picture is scanned and submitted through SEIMS where a facial recognition program and available criminal photos shows a possible match to several individuals, including a gang member from Brooklyn.

Day 4: Officers enter information about the gang member and his known associates into semantic computing application server. The semantic graph displays a link between this gang member and a pawn shop through a relative of an initial victim.

Day 5: Investigators secure warrants for known gang headquarters, associated pawn shops and the relative, arrests are made.

In this scenario, SEIMS would help local law enforcement find connections and correlations they may not have seen as easily or as quickly without using SEIMS.

Purpose Example 3

In this Example, the User Agency is the U.S. Coast Guard.

Process: The U.S. Coast Guard is responsible for intercepting would-be illegal migrants before they illegally enter the U.S. Current processes have the Coast Guard personnel scan fingerprints and take digital pictures of these would-be illegal migrants with this information sent to a biometrics "on-match" database. Immediate results may be provided to show that the individual(s) may have terrorist connections, be a formerly deported migrant or a criminal. If a result is obtained indicating that the person(s) scanned has a terrorist connection, has been deported previously or has a criminal record in the U.S. or his/her country of origin, the person(s) is (are) detained and turned over to the appropriate authority.

Background: The U.S. Coast Guard, in addition to search and rescue operations, works in conjunction with federal and local agencies transferring found smugglers to DHS-ICE custody, criminals to the custody of the appropriate agency and other illegal migrants to ICE and U.S. Customs and Border Protection Office of Field Operations Inspectors.

Through various state and federal joint programs they are apprised of ongoing investigations that might be linked with smuggling of people and goods.

SEIMS can assist the Coast Guard by linking found smugglers and would be migrants to specific ongoing investigations and/or criminal activities.

Sample Scenario 5: SEIMS performs social network analysis and alerts officials of derogatory links.

Day 1: The U.S. Coast Guard creates several pages in semantic computing application server about ongoing investigations that might involve the smuggling of people and/or goods.

Specifically, pages in semantic computing application server are created about the Cali drug cartel based in Miami and Texas. Pages for all the known leaders of the criminal drug ring are entered both in the U.S. and in Columbia as well as information about methods and practices such as money laundering, murder and various smuggling activities in Miami and Texas.

Day 185: The U.S. Coast Guard intercepts a go-fast vessel with six persons on a suspected heading to a Miami seaport. An example of a go-fast vessel according to Coast Guard Commandant Adm. James M. Loy is as follows: "The typical go-fast is 30 to 40 feet long and is capable of carrying up to two tons of drugs to ranges up to 1,300 miles at speeds of 40 to 50 knots—twice the speed of a typical Coast Guard cutter. Because they often are designed with low-observable features and multiple high-performance outboard engines—and employ sophisticated radar and stealthy tactics, such as operating under camouflage or with night-vision goggles under cover of darkness—they have become the conveyance of choice for drug smugglers." (http://www.navvleague.org/sea_ power/jun_01_08.php). The fingerprints and digital pictures taken find immediate biometric on-match results to six of the individuals. Three persons were previously deported to Columbia. A fourth has outstanding warrants from Texas and the remaining 2 had previously been caught trying to enter the U.S. illegally. The group is detained.

Day 186: Detained person information is entered into the semantic computing application server. SEIMS' semantic graph shows a relationship link with two of the detainees to former leaders of the Cali cartel. Additionally, the outstanding warrants from Texas indicate drug and money laundering activity. This expanded information may show that the former Cali cartel, considered stopped in 2004, may be in the process of reforming.

Systems that integrate data sources with biometric scanning systems such as iris scanning, fingerprint scanning and facial recognition are available, but currently searches are separate from analysis systems.

Preset searches and alerts can be set for the user. So, for example, DHS' immigration department (ICE) may have automatically programmed all fingerprint IDs to scan the person's fingerprint against his/her passport fingerprint and against the databases of all persons of interest/watch list fingerprints. The immigration agent at JFK will scan in the person's fingerprint and the checks against the passport and other databases will automatically occur. No one would have to be singled out and no commands given—the system would automatically search through approximately one million other fingerprints per second only providing alerts when an inconsistency is identified.

Alerts can be set to transcend the boundaries of agency lines. Once the boundaries of what can be sent to various agencies is set in SEIMS, all alerts can automatically be sent as requested to all participating agencies eliminating the problem of protocol and dissemination among users of SEIMS.

SEIMS can provide anomaly detection useful in the search to verify or dispute identity by taking a grouping of information and searching for anomalies. For instance, you may have the record of an iris scan associated with a California location and a name at a specific time and date, if data sources, eyewitness reports or the person's statement is contrary to that information an anomaly is detected. Another anomaly detection example would be that fingerprint verification to a passport of a 20 something male is taken but the name on the passport with document number is a match to someone in their late 50s an anomaly will be detected.

SEIMS can provide a list of similar anomalies. For example, an anomaly is detected that seems unusual, a search can be done for similar anomalies to see if this is a new pattern in behavior or if this pattern has been used previously toward a specific end.

SEIMS can detect duplicate entries. For example there may be 2500 Robert Alan Smith Jr. traveling to the U.S. from the UK. SEIMS can detect if the Robert Alan Smith Jr. who is currently scanning his fingerprint awaiting entry from an international flight is someone who has entered previously, using a different passport or if this is a duplicate entry for a Robert Alan Smith Jr. who departed the day before and is now returning for a renewed visitor visa.

Insertion and extraction of data that is automatically compared against semantically normalized data that came from several disparate data sources at the same time provides a large time advantage and decreases the need for personnel to access several systems with the same information. Alerts can be provided and shared as appropriate throughout the system immediately providing a wider network of personnel who can take action in any given case. The increase in data sources means that more useful information can be provided more quickly. SEIMS also provides an opportunity for the various aspects of DHS, Law Enforcement and U.S. Coast Guard to work together as an integrated whole. The well publicized cases of a criminal pursued by one agency stopped by a state trooper for a traffic violation and released because the trooper has no knowledge of the case can be a tale of the past not a headline in the future.

Various servers and clients disclosed herein, can include, for example, among other things, processors, displays, input/output devices, and memories, which can be interconnected. In some embodiments, the memories contain storage devices for storing programs and/or software modules for controlling the processors or performing methods, for example, those methods described herein with reference to FIGS. 1-7. In addition, although some embodiments are described herein as being implemented on a client and/or a server, this is only illustrative. Various components of some embodiments of the disclosed subject matter can be implemented on any suitable platform.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention.

What is claimed is:

1. A semantically enhanced identity management system providing a network semantic graph comprising concept instances and relations between the concept instances, the system comprising:

a plurality of semantic servers in communication with each other and with distributed sources, wherein each of the plurality of semantic servers comprises:

a first interface for receiving biometric results from a biometric matching system that processes biometric data, wherein the biometric results include biometric data for at least one person;

a second interface for receiving semantic data including semantically descriptive annotations from the distributed sources and other ones of the plurality of semantic servers; and a processor programmed to:
process the semantic data based on the semantically descriptive annotations of the data to form a local semantic graph that associates the concept instances with each other using the relations;
integrate the biometric results with the local semantic graph; and
use the information stored in the local semantic graph to identify a person; and
memory for storing the local semantic graph;
wherein each local semantic graph of each of the plurality of semantic servers comprises a portion of the network semantic graph distributed across the plurality of semantic servers.

2. The system of claim 1, wherein the processor is further programmed to issue an alert to at least one user based on the network semantic graph, a biometric signature, and the biometric match results.

3. The system of claim 1, wherein the biometric matching system comprises at least one of a facial recognition system, an iris identification system, a hand geometry system, a palm scanning system, a signature/handwriting analysis system, a voice imaging/mapping system, a 3D facial/movement reconstruction or identification system, a photo/video enhancement and identification system, and a sound identification system.

4. The system of claim 1, wherein the first interface and the second interface comprise the same physical interface.

5. The system of claim 1, wherein processors of some of the plurality of semantic servers are programmed to update the network semantic graph while processors of others of the plurality of semantic servers are programmed to operate on the network semantic graph.

6. The system of claim 1, wherein the processor is programmed to provide anomaly detection to verify an identity of a person.

7. The system of claim 6, wherein the anomaly detection to verify an identity of a person includes anomaly detection to dispute an identity of a person.

8. The system of claim 7, wherein the processor is further programmed to group information and search for anomalies, wherein the information includes at least one of specific indicators of suspicious activity or persons of interest based on the persons nationality, travel patterns, age, associations, declarations, stated reasons to travel, hotels, flights and duration of stay.

9. The system of claim 7, wherein the processor is further programmed to provide a list of similar anomalies so that a search can be done for the similar anomalies to determine if a new pattern in behavior exists or if the pattern has previously occurred.

10. A semantically enhanced identity management server storing a local semantic graph comprising concept instances and relations between the concept instances, the semantic server comprising:
a first interface for receiving biometric results from a biometric matching system that processes biometric data;
a second interface for receiving data including semantically descriptive annotations from distributed sources and other ones of the plurality of semantic servers;
a processor programmed to:
process data based on the semantically descriptive annotations of the data to form the local semantic graph that associates the concept instances with each other using the relations;
integrate the biometric results with the local semantic graph; and
use the information stored in the local semantic graph to identify a person; and
memory for storing the local semantic graph, the local semantic graph comprising part of a network semantic graph distributed among a plurality of semantic servers.

11. The server of claim 10, wherein the process is further programmed to issue an alert to at least one user based on the network semantic graph, a biometric profile, and the biometric results.

12. The server of claim 10, wherein the biometric matching system comprises at least one of a facial recognition system, an iris identification system, a hand geometry system, a palm scanning system, a signature/handwriting analysis system, a voice imaging/mapping system, a 3D facial/movement reconstruction or identification system, a photo/video enhancement and identification system, and a sound identification system.

13. The server of claim 10, wherein the first interface and the second interface comprise the same physical interface.

14. The system of claim 10, wherein the processor is further programmed to provide anomaly detection to verify an identity of a person.

15. The system of claim 14, wherein the anomaly detection to verify an identity of a person includes anomaly detection to dispute an identity of a person.

16. The system of claim 15, wherein the processor is further programmed to group information and search for anomalies, wherein the information includes at least one of affiliations, associations, suspicious activities, and patterns.

17. The system of claim 15, wherein the processor is further programmed to provide a list of similar anomalies so that a search can be done for similar anomalies to determine if a new pattern in behavior exists or if the pattern has previously occurred.

18. A method for providing at least one client access to a network semantic graph distributed among a plurality of semantic servers wherein the network semantic graph comprises concept instances and relations between the concept instances, the method comprising:
receiving first data including semantically distributed annotations from distributed data sources in communication with the plurality of semantic servers;
based on the first data including the annotations, linking the concept instances using the relations;
storing the concept instances and relations as a local semantic graph comprising a part of the network semantic graph;
receiving biometric results from a biometric matching system that processes biometric data;
integrating the biometric results with the local semantic graph;
creating at least one subscription of interest over the network semantic graph in response to a request from the at least one client;
collecting second data from the distributed data sources based on the at least one subscription;
semantically annotating the second data;
updating the local semantic graph based on the semantic annotation; and
sending alerts to the at least one client based on updates to the local semantic graph matching the at least one subscription of the at least one client.

19. The method of claim 18, wherein sending alerts to the at least one client includes issuing an alert to the at least one client based on the network semantic graph, a biometric profile, and the biometric results.

20. The method of claim 18, wherein the biometric matching system comprises at least one of a facial recognition system, an iris identification system, a hand geometry system, a palm scanning system, a signature/handwriting analysis system, a voice imaging/mapping system, a 3D facial/movement reconstruction or identification system, a photo/video enhancement and identification system, and a sound identification system.

* * * * *